United States Patent [19]

O'Neill et al.

[11] 4,318,023
[45] Mar. 2, 1982

[54] SAGITTALLY AMPLIFIED PIEZOELECTRIC ACTUATOR

[75] Inventors: Cormac G. O'Neill, Walnut Creek; Parker C. Smiley, Oakland, both of Calif.

[73] Assignee: Physics International Company, San Leandro, Calif.

[21] Appl. No.: 123,215

[22] Filed: Feb. 21, 1980

[51] Int. Cl.³ .............................................. H01L 41/08
[52] U.S. Cl. ...................................... 310/328; 310/321
[58] Field of Search ................................ 310/328, 321; 179/110 A

[56] References Cited

U.S. PATENT DOCUMENTS

| | | | |
|---|---|---|---|
| 2,416,887 | 3/1947 | Tibbetts | 310/328 X |
| 2,810,082 | 10/1957 | Tibbetts | 310/328 X |
| 3,558,936 | 1/1971 | Horan | 310/328 X |
| 3,649,857 | 3/1972 | Knappe | 310/328 X |
| 3,697,790 | 10/1972 | Flint et al. | 310/328 |
| 4,193,703 | 3/1980 | Sakmann | 310/328 X |

FOREIGN PATENT DOCUMENTS 608206 4/1978 U.S.S.R. .............................. 310/328

Primary Examiner—Mark O. Budd
Attorney, Agent, or Firm—Robert R. Tipton

[57] ABSTRACT

An electroexpansive linear actuator utilizes a sagittal tension member to amplify linear motion in which the electroexpansive member is placed in compression between a fixed base support and a lever support member hingedly connected to the fixed base. One end of the sagittal tension member is attached to the fixed base while the other end is attached to the lever support member distal the hinge point. The device to be actuated is connected proximate the midpoint of the sagittal tension member and moves perpendicular to the longitudinal axis of the sagittal tension member when the electroexpansive member expands and contracts. A second embodiment of the actuator utilizes a second lever support arm instead of the fixed base as a bearing support for the other end of the electroexpansive member.

3 Claims, 5 Drawing Figures

U.S. Patent  Mar. 2, 1982  Sheet 1 of 2  4,318,023
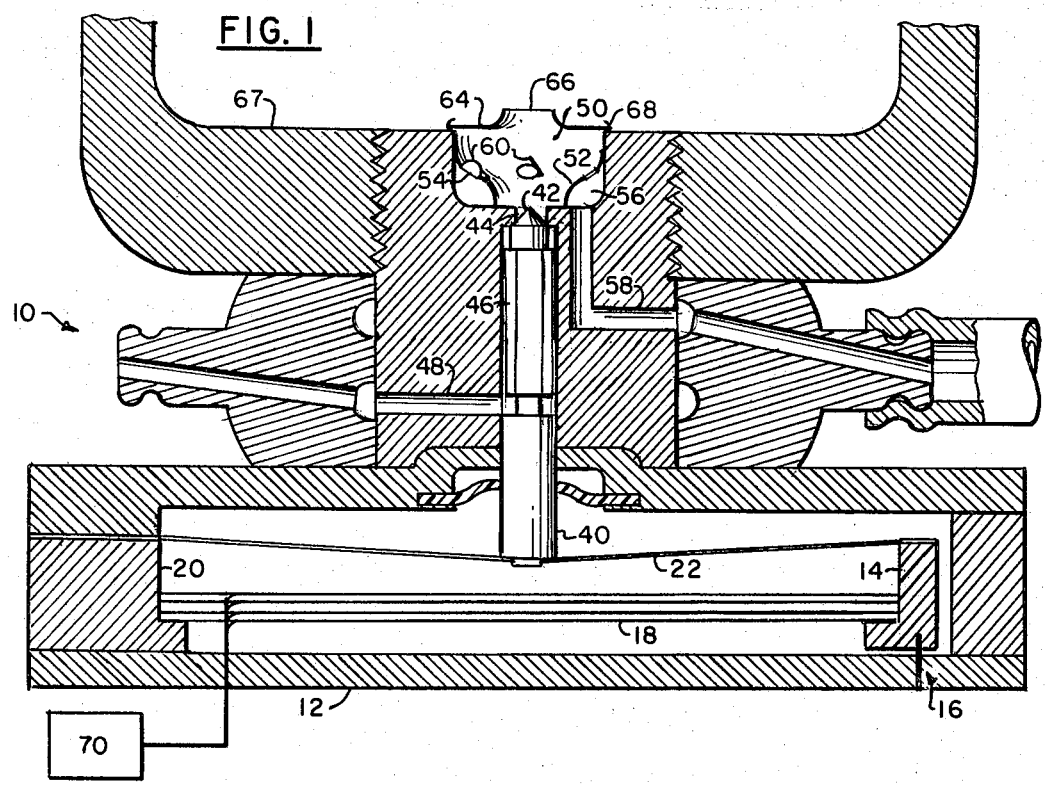
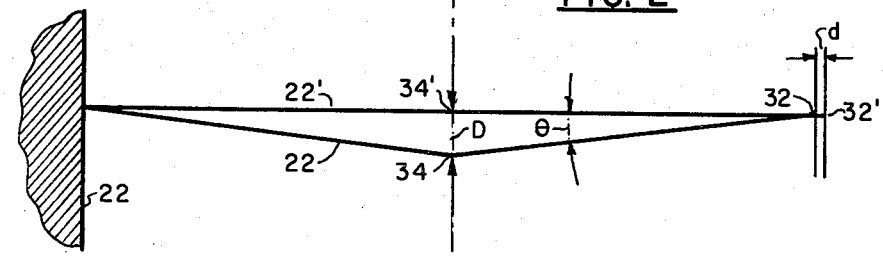
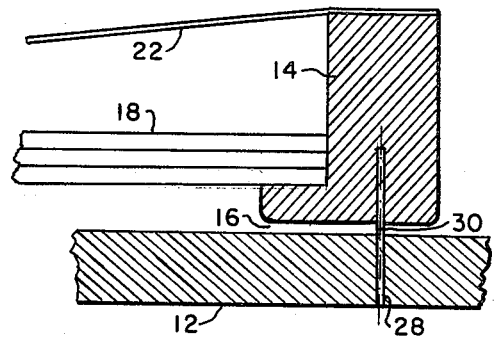

SAGITTALLY AMPLIFIED PIEZOELECTRIC ACTUATOR

BACKGROUND OF THE PRIOR ART

This invention relates generally to linear actuator devices and in particular to piezoelectric linear actuators utilizing motion amplification.

Many piezoelectric or electroexpansive actuators of the prior art utilized various lever arm arrangements by which the lever arm was pivotally connected to a fixed support with the piezoelectric member placed in compression against the lever arm a short distance from the pivot point. The motion amplification was achieved at the end of the lever arm distal the pivot point and was based upon the ratio of the distance from the pivot point of the piezoelectric member and the end point of the lever arm away from the pivot point.

Other devices used to achieve motion amplification for piezoelectric actuators involved the use of hydraulic amplification in which the piezoelectric member was used to move a piston having a large surface area moving an hydraulic fluid. The hydraulic fluid was then used to drive a smaller area piston a greater distance. The motion amplification was directly proportional to the ratio of piston areas.

In all of the prior art devices the mass of the mechanical amplifying systems were large resulting in a limitation of the reaction time of the linear actuator.

SUMMARY OF THE INVENTION

The apparatus of the present invention reduces the mass requirements of the electroexpansive actuator in that it comprises, basically, a fixed base support on which is hingedly mounted at least one lever arm support connected to one end of a sagittal tension member. An electroexpansive member is placed in compression against the lever support arm causing it to move the sagittal tension member longitudinally to deflect the midpoint of the sagittal tension member perpendicular to its longitudinal axis as the electroexpansive member expands and contracts.

It is, therefore, an object of the present invention to provide a device for amplifying the motion of an electroexpansive device.

It is a further object of the present invention to provide a device for amplifying the motion of an electroexpansive member having a lower overall mass.

It is another object of the present invention to provide a device for amplifying the motion of an electroexpansive member having a fast reaction time.

It is still another object of the present invention to provide a device for amplifying the motion of an electroexpansive member utilizing a sagittal tension member.

It is still a further object of the present invention to provide a device for amplifying the motion of an electroexpansive member utilizing both lever arm amplification as well as sagittal tension member amplification.

It is yet another object of the present invention to provide a sagittally amplified piezoelectric valve.

It is still yet another object of the present invention to provide a sagittally amplified actuator utilizing double lever arm actuators.

These and other objects of the present invention will become manifest upon careful study of the following detailed description when taken together with the drawings.

BRIEF DESCRIPTION OF THE DRAWINGS

FIG. 1 is a cross-sectional, elevational view of a typical sagittally amplified piezoelectric actuator used to actuate a valve.

FIG. 2 is a schematic diagram showing the motion amplification of the sagittal tension member.

FIG. 3 is a detailed cross-sectional, elevational view of the method of hinging the lever support arm member to the fixed base support of FIG. 1.

DESCRIPTION OF THE PREFERRED EMBODIMENT

Figures 4, 5:
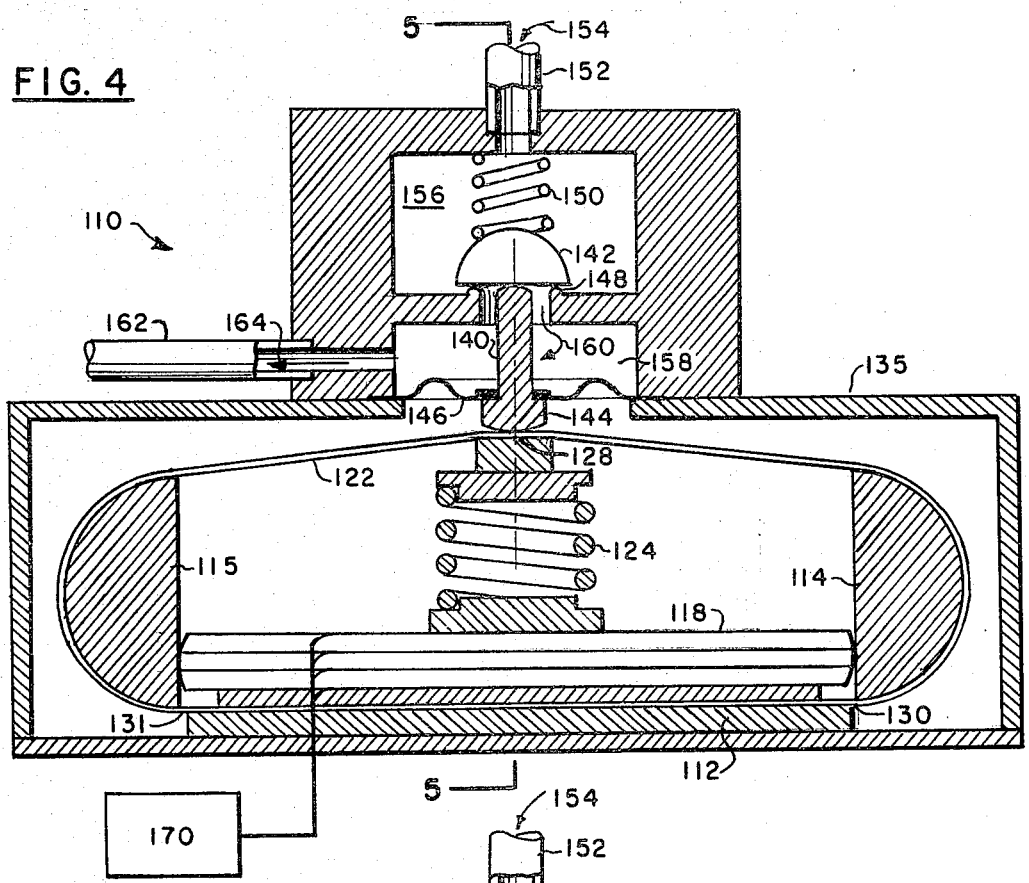
FIG. 4 is a cross-sectional, elevational side view of a further embodiment of the sagittally amplified piezoelectric actuator of the present invention used to operate a valve.
FIG. 5 is an end cross-sectional, elevational view of the sagittally amplified piezoelectric actuator of FIG. 4 taken at lines 5—5.

With reference to FIG. 1, sagittally amplified piezoelectric valve 10 of the present invention comprises, basically, a fixed base support 12 to which is connected a lever support arm 14 using hinge member 16. A piezoelectric or electroexpansive member 18 is disposed in compression between end support bracket 20 of fixed base support 12 and lever support member 14.

Sagittal tension member 22 is attached, at one end, to end support bracket 20 and at its other end to the end of lever support arm member 14 distal hinge 16. Sagittal tension member 22 comprises a resilient strap or spring that is deformed proximate its midpoint to define an obtuse angle less than 180 degrees and greater than about 170 degrees when not under tension.

With reference to FIG. 3, there is illustrated an enlarged cross-sectional view of hinge 16 which comprises two or more resilient wires 28 having one end imbedded in one end of a lever support arm 14 and the other end imbedded in fixed base support 12. A separation of approximately one wire diameter between support member 14 and fixed base support 12 is made to define pivot point 30 and allow lever arm support 14 to rotate or rock back and forth about hinge or pivot axis through point 30.

At the end of lever support arm 14 distal hinge or pivot point 30 is attached one end of sagittal tension member 22 at point 32 as by welding or the like.

It can be seen that as lever support arm 14 rotates clockwise about pivot point 30, the tension in sagittal tension member 22 is increased. As lever support arm 14 rotates in the opposite direction about pivot point 30, the tension in sagittal tension member 22 is decreased.

The movement resulting from the rotation of lever support arm 14 is schematically illustrated in FIG. 2 in which the relaxed position of the sagittal tension member is shown for sagittal tension member 22. The fully stressed position is shown by sagittal tension member 22'. The position of attachment point 32 of sagittal tension member 22 is also shown relative to the position of the same point 32' for sagittal tension member 22' in the fully stressed condition.

It can be seen that the linear motion of point 32 along the longitudinal axis of the sagittal tension member, designated by the distance "d" is substantially less than the movement of the midpoint 34, perpendicular to the longitudinal axis of sagittal tension member 22 to the point 34' of sagittal tension member 22', a distance "D", when the sagittal tension member is in the stressed condition.

The amplification factor of sagittal tension member 22 can be calculated based on the geometry of the system using trigonometric methods as follows:

$$A = \cotan \frac{\theta 1 + \theta 2}{2}$$

where,

A = amplification factor = D/d

D = deflection of midpoint of sagittal tension member perpendicular to longitudinal axis of sagittal tension member 22.

d = deflection of end of sagittal tension member along the longitudinal axis of sagittal tension member 22.

θ1 = initial angle of sagittal tension member 22 from horizontal.

θ2 = final angle of sagittal tension member 22 from horizontal.

Further amplification is achieved, as can be seen in FIGS. 1 and 3, by the ratio of the distance from pivot point 30 to the point of attachment 32 of sagittal tension member 22 to the distance from the bearing point of the end of piezoelectric member 18 to pivot point 30.

With reference again to FIG. 1, the valve portion of piezoelectric valve 10 comprises, basically, a valve stem 40 having its lower portion connected to sagittal tension member 22 proximate the midpoint of sagittal tension member 22 with its upper end defining a cone 42 and resting against valve seat or outlet port 44.

The upper portion 46 of valve stem 40 has a cross section with flats to provide a generally triangular multisided shape to permit the flow of fluid from inlet conduit 48 about the exterior surface of valve stem 40 to eventually flow into injection cavity 50 through outlet port 44.

A funnel member 52 forms injection cavity 50 to assist in the mixing of a gas or combustion air with the liquid or fuel passing around valve stem 40.

Funnel 52 is provided with a plurality of ports or holes 54 to permit a gas or combustion air entering cavity 56 from air supply conduit 58 to pass out into injection cavity 50. Holes 54 are formed by partial shearing and allowing the partially punched out metal to remain as a tangential deflector 60.

Funnel member 52 is closed above ports or holes 54 by disc member 64 which is also provided with a central port of hole 66. Disc member 64 is held in position in funnel member 52 by forming the metal of the funnel to form lip 68. Hole 66 is positioned to discharge into the intake manifold 67 of an engine at a point downstream of the(throttle valve.

To operate piezoelectric valve 10 of the present invention, a voltage is first applied to piezoelectric member 18 from power supply 70. When positive voltage is applied to the layers of piezoelectric member 18, electric field is applied transversely to the individual piezoelectric layers. This field causes member 18 to contract longitudinally. When the applied voltage is removed, member 18 will expand longitudinally.

Under these circumstances, when no voltage is applied to piezoelectric member 18, it will remain in compression forcing lever support arm 14 to apply a clockwise moment about pivot point 30 to generate tension in sagittal tension member 22, thus causing stem 40 to be held up against valve seat or outlet port 44.

As soon as a voltage is applied to piezoelectric member 18 by power supply 70, piezoelectric member 18 contracts longitudinally allowing lever arm support 14 to rotate in a counterclockwise direction. This movement decreases the tension on sagittal tension member 22 allowing it to move towards its relaxed position which permits valve stem 40 to move downwardly away from valve seat 44 and allow fluid to flow therethrough.

Fluid then begins to flow through exit port or valve seat 44 into cavity 50 where it mixes with air having high rotational velocity imparted by deflector plate 68. The vacuum of the intake manifold 67 draws the swirling mixture through hole 66 so that a cone of finely dispersed fuel particles is discharged into the intake manifold.

The now vaporized fluid-air mixture is conveyed through the remainder of the manifold (not shown) common in the art, or the like, to an apparatus for utilizing the mixture.

With respect to FIGS. 4 and 5, there is illustrated another embodiment of the sagittally amplified piezoelectric actuator 110 of the present invention comprising, basically, a fixed base support member 112 which is hingedly or pivotally connected proximate each end to a first lever support arm member 114 and a second lever support arm member 115, respectively.

Piezoelectric member 118 is disposed in compression with one end bearing against lever support arm 114 and the other end bearing against second lever support arm 115.

Sagittal tension member 122 is wrapped around this combination of piezoelectric member 118, first lever support arm 114 and second lever support arm 115 to hold the combination under compression. It will be noted that lever support arms 114 and 115 define half cylinders to avoid sharp bends in sagittal tension member 122 as well as reduce friction losses during their hinging action. Sagittal tension member 122 acts in the manner of a hinge proximate the bottom of lever support arms 114 and 115 where they meet fixed base 112.

Fixed base support 112 is attached to sagittal tension member 122 along the lower side of the combination. The ends of fixed base support 112 can be located proximate the inside end or edge of lever support arms 114 and 115, respectively, to allow for pivotal movement of the lever support arms.

A spring member 124 biased to push or force sagittal tension member 122 upwardly or outwardly in a direction away from fixed base 112 is located proximate the midpoint 128 of the combination on sagittal tension member 122. The other end of spring 124 rests against piezoelectric member 118 proximate its midpoint.

The above combination covers, for the most part, the sagittally amplified piezoelectric actuator portion of sagittally amplified piezoelectric valve 110.

It can be seen from FIG. 4 that as piezoelectric member 118 expands and contracts, lever support arms 114 and 115 will be caused to rotate about pivot or hinge points 130 and 131, respectively, with their upper end deflecting toward and away from each other. This will, of course, cause midpoint of the upper portion of sagittal tension member 122 to deflect upwardly and downwardly against helical spring 124. This deflection distance is proportionally greater than the end deflection of lever support arms 114 and 115 in accordance with the prior discussed amplification equation, however, taking into account that there is a longitudinal deflection at both ends of sagittal tension member 122 rather than at one end as shown in FIG. 2.

It will also be noted that the motion of piezoelectric member 118 is further amplified by its relative position to hinge points 130 and 131 when compared to the diameter of lever support arms 114 and 115.

A housing 135 is used to enclose the actuator portion of the device of FIG. 4 to protect the apparatus from dust and moisture.

The valve portion of sagittally amplified piezoelectric valve 110 comprises, basically, a poppet head 142 and a spring 150. A stem 140 is connected to a movable diaphragm 146 disposed so that the stem can contact poppet 142 when upwardly actuated by midpoint 128 of sagittal tension member 122 by means of push rod or member 144.

Poppet head 142 is held in place against valve seat or lips 148 by helical spring 150.

It can be seen that upward movement of valve stem 140 will lift poppet head away from valve seat 148 to allow fluid to flow past.

To operate piezoelectric valve 110 of the present invention, a voltage is applied to piezoelectric member 118 from power supply 170.

When a positive voltage is applied to the layers of piezoelectric material in member 118, it contracts longitudinally. When the voltage is removed, member 118 expands longitudinally.

Under these circumstances, when no voltage is applied to piezoelectric member 118, it will remain in compression forcing lever support arms 114 and 115 apart to maintain tension in sagittal tension member 122. Under this condition, sagittal tension member 122, at midpoint 128, will be at its downward limit with maximum compression of helical spring 124. In turn, valve stem 140 will be in a downward position allowing poppet head 142 to seat on valve seat 148 and to stop the flow of fluid through the valve.

When a voltage is applied to piezoelectric member 118, it will be caused to contract thus permitting the upper ends of lever support arms 114 and 115 to rotate or move together and release the tension on sagittal tension member 122. Helical spring 124 will then bias midpoint 128 of sagittal tension member 122 upwardly to raise poppet head 142 away from valve seat 148. Fluid will then be permitted to flow through inlet conduit 152, as indicated by arrow 154, into upper chamber 156, and down into chamber 158, as indicated by arrow 160, and then out through outlet conduit 162, as indicated by arrow 164.

It can further be seen that, for the embodiment illustrated, the mass of the moving parts is low and affords a rapid response time for the actuator.

We claim:

1. An electroexpansive actuator comprising
   a sagittal tension member having a first end and a second end comprising an elongated resilient strap deformed proximate its midpoint to cause said ends extending longitudinally from each side of said midpoint to define an obtuse angle,
   an electroexpansive member having a first end and a second end adapted to exert a tensile force in said sagittal tension member coincident with the longitudinal axis of said sagittal tension member,
   means for connecting said first end of said electroexpansive member to said first end of said sagittal tension member, said means comprising
   a fixed support member,
   a lever arm support member having first and second ends,
   means for connecting said first end of said sagittal tension member to said first end of said lever arm member, and
   means for hingedly connecting said second end of said lever arm member to said fixed support member, said means comprising
   at least one wire having one end attached to said second end of said lever arm and the other end of said wire connected to said fixed support member,
   means for connecting said second end of said electroexpansive member to said second end of said sagittal tension member,
   means for applying a voltage to said electroexpansive member for varying the dimensions thereof, and
   means for operating a device connected proximate the midpoint of said sagittal tension member.

2. An electroexpansive actuator comprising
   a fixed base support,
   a lever arm member,
   means for hingedly connecting said lever arm member adjacent said means for hingedly connecting said lever arm member to said fixed base support and adapted to amplify the motion of said electroexpansive member by rotating said lever arm member about said means for hingedly connecting said lever arm to said fixed base support,
   a sagittal tension member defining an obtuse angle having one end connected to said fixed base and the other end connected proximate the end of said lever arm member distal said means for hingedly connecting said lever arm member to said fixed base support, whereby rotation of said lever arm about said means for hingedly connecting said lever arm to said fixed base support creates tension in said sagittal tension member in a direction coincident with the longitudinal axis of said sagittal tension member,
   means for operating a device connected to said sagittal tension member proximate the midpoint thereof, and
   means for applying a voltage to said electroexpansive member to increase and decrease the longitudinal dimension thereof.

3. An electroexpansive actuator comprising
   a rigid base support,
   a sagittal tension member generally defining a loop of flexible material having one side connected to said base support,
   a pair of first and second lever arm members disposed proximate opposite ends within said looped sagittal tension member,
   an electroexpansive member having one end bearing in compression against said first lever arm member and the other end bearing in compression against said second lever arm member,
   means for operating a device connected to said sagittal tension member proximate the midpoint thereof between said first and second lever arm members distal said rigid base support, and
   means for applying a voltage to said electroexpansive member whereby said electroexpansive member changes length between said first and second lever arm members when a voltage is applied to said electroexpansive member.

* * * * *